United States Patent [19]
Maurice et al.

[11] Patent Number: 5,883,750
[45] Date of Patent: Mar. 16, 1999

[54] METHOD AND SYSTEM FOR THE MAGNETIC RECORDING OF INFORMATION ELEMENTS AND INFORMATION MEDIUM BY PROVIDING CURRENT CORRECTION FOR CROSS-TALK MAGNETIC FLUX

[75] Inventors: François Maurice, Verrieres le Buisson; Michel Sonrier, Bois D'Arcy; François-Xavier Pirot, Magny, all of France

[73] Assignees: Thomson-CSF, Paris; Thomson Consumer Electronics, Courbevoie, both of France

[21] Appl. No.: 708,780

[22] Filed: Sep. 9, 1996

Related U.S. Application Data

[63] Continuation of Ser. No. 256,905, filed as PCT/FR93/01277 Dec. 21, 1993 published as WO94/15332, Jul. 7, 1994, abandoned.

[30] Foreign Application Priority Data

Dec. 22, 1992 [FR] France ................................. 9215472

[51] Int. Cl.$^6$ .................................................. G11B 15/12
[52] U.S. Cl. ................................... 360/63; 360/124
[58] Field of Search .......................... 360/63, 121, 114, 360/115, 113, 47, 124, 64, 46; 369/18, 275.3, 89, 109, 44.41, 44.37

[56] References Cited

U.S. PATENT DOCUMENTS

| | | | |
|---|---|---|---|
| 2,986,608 | 5/1961 | Pettus et al. | 360/124 |
| 3,824,623 | 7/1974 | Gucker | 360/124 |
| 3,987,256 | 10/1976 | Nagamura | 369/89 |
| 4,303,956 | 12/1981 | Kobubu | 360/123 |
| 4,331,992 | 5/1982 | Klein et al. | 360/124 |
| 4,484,238 | 11/1984 | Vinal | 360/47 |
| 4,965,681 | 10/1990 | Takimoto | 360/64 |
| 5,089,923 | 2/1992 | Lehureau | 360/121 |
| 5,124,869 | 6/1992 | Lehureau | 360/121 |
| 5,304,950 | 4/1994 | Martin et al. | 330/308 |
| 5,394,286 | 2/1995 | Burkin et al. | 360/63 A |
| 5,420,734 | 5/1995 | Colineau et al. | 360/113 |
| 5,493,553 | 2/1996 | Maurice et al. | 369/44.37 X |

FOREIGN PATENT DOCUMENTS

| | | |
|---|---|---|
| 0012264 | 6/1980 | European Pat. Off. . |
| 0097836 | 1/1984 | European Pat. Off. . |
| 0098358 | 1/1984 | European Pat. Off. . |
| 340085 | 11/1989 | Japan . |
| 290805 | 12/1991 | Japan . |

OTHER PUBLICATIONS

Research Disclosure, #333, 1–92, "Tracking Utilizing Sync Signals".

*Primary Examiner*—Paul W. Huber
*Assistant Examiner*—Patrick Wamsley
*Attorney, Agent, or Firm*—Oblon, Spivak, McClelland, Maier & Neustadt, P.C.

[57] ABSTRACT

A method and system of magnetic recording of information elements on several parallel tracks whereby the recording of information elements on a track is accomplished by inducing a magnetic field having a predetermined direction in a zone on the track and, during this recording, inducing a magnetic field with a reverse direction in zones of the neighboring tracks. A winding (L0, L1, L2) of each head is coupled to at least two winding of neighboring heads. A control current transmitted to the head provides at least one current diverted towards the neighboring heads.

11 Claims, 5 Drawing Sheets

CONVENTIONAL SYSTEM

MATRIX HEAD

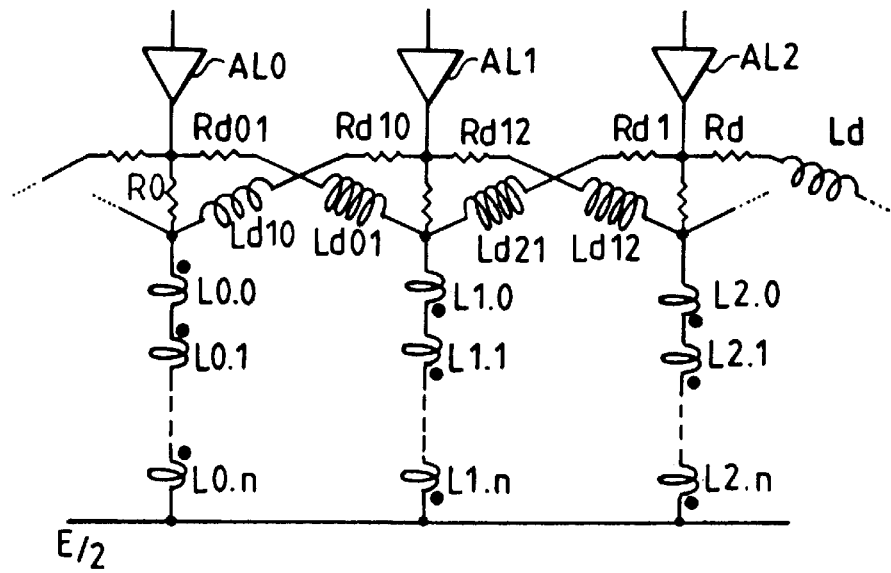
FIG.6
FIG.7
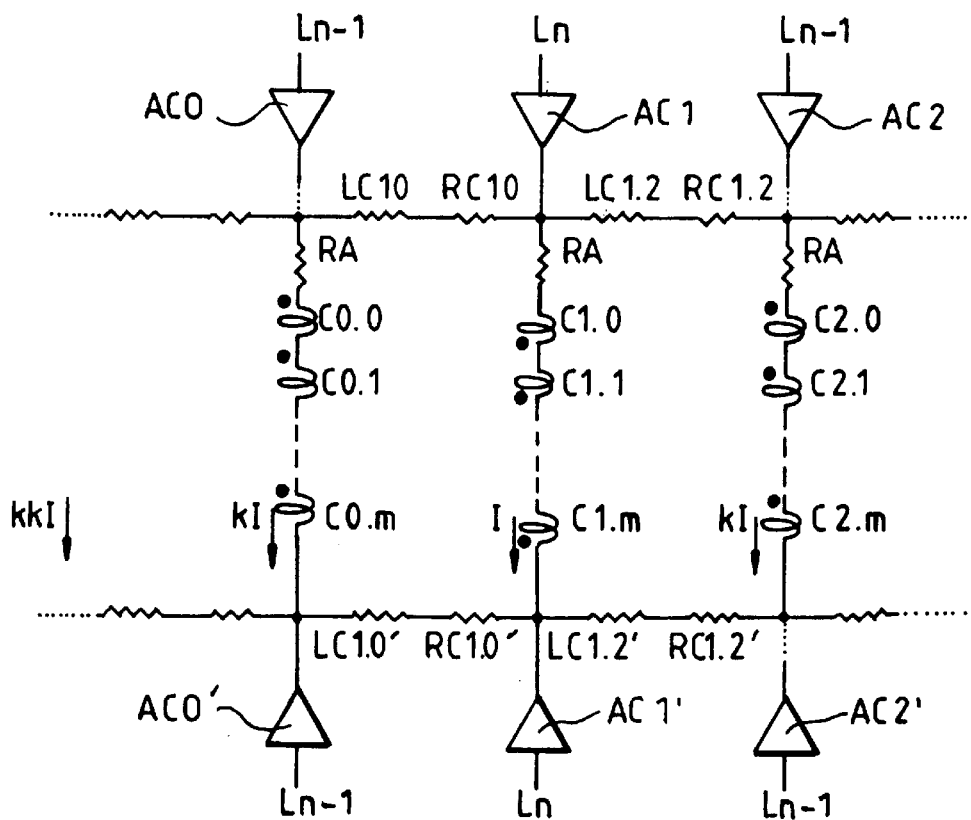

METHOD AND SYSTEM FOR THE MAGNETIC RECORDING OF INFORMATION ELEMENTS AND INFORMATION MEDIUM BY PROVIDING CURRENT CORRECTION FOR CROSS-TALK MAGNETIC FLUX

This application is a Continuation of application Ser. No. 08/256,905, filed on Aug. 9. 1994, now abandoned which was filed as PCT Application No. PCT/FR93/01277 filed on Dec. 21, 1993.

The invention relates to a method and the system for the magnetic recording of information elements on several parallel tracks. It relates more particularly to the field of recording on magnetic tape and concerns digital multitrack magnetic writing systems.

The increase in bit rates and in the storage density of information is often accompanied by an increase in the number of magnetic write heads and their integration density. This accentuates the phenomenon of cross-talk in writing between tracks to the extent of making the method prohibitive in certain cases. The magnetic field lines of a head can get closed through the magnetic folds of neighboring heads all the more easily as their distance is reduced. The method and the system described by this invention provide a solution that can be used to correct the cross-talk introduced at the time of writing. They can be matched to any conventional system of multitrack writing as shown in FIG. 1 using several write heads.

They can also be applied to multitrack and static matrix-type heads as described in the French patent application No. 88 05592 and shown in FIG. 2.

A recording head of this kind has a large number of magnetic poles that are distributed over L rows and C columns and that give rise to recording on a magnetic medium having almost adjoining tracks (p0, p1, p2, . . . ).

As shown in FIG. 3, the magnetic flux induced by a magnetic head and the writing of this head can therefore be distorted by the magnetic flux of the first head.

The invention can be used to resolve this problem and can be applied to magnetic heads of the type shown in FIG. 1 as well as to the matrix-type magnetic heads of FIG. 2.

The invention therefore relates to a method for the magnetic recording of information elements on several parallel tracks according to which the recording of an information element on a track is done by the induction of a magnetic field having a determined direction in a zone of this track characterized in that, during the recording of an information element on a track, there is induced a magnetic field with a direction that is opposite to said determined direction in zones of the neighboring tracks.

The invention also relates to a magnetic recording system comprising at least one series of magnetic recording heads enabling the recording of information elements on several tracks of a magnetic recording medium characterized in that the winding of each head is coupled at least to the windings of the head that neighbor it, a control current transmitted to said head thus giving rise to at least one magnetic field diverted towards the neighboring heads.

The different objects and features of the invention shall appear more clearly from the following description and from the appended figures, of which:

Figures 5A, 5B:
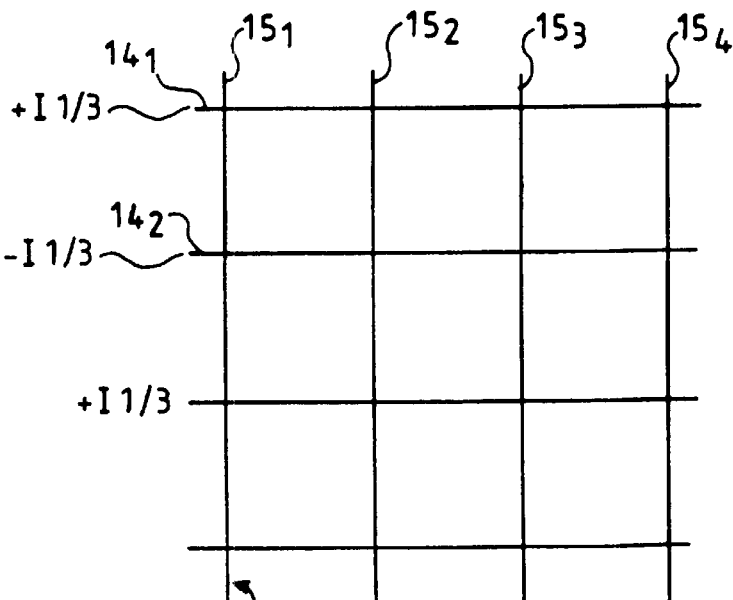
Figure 8:
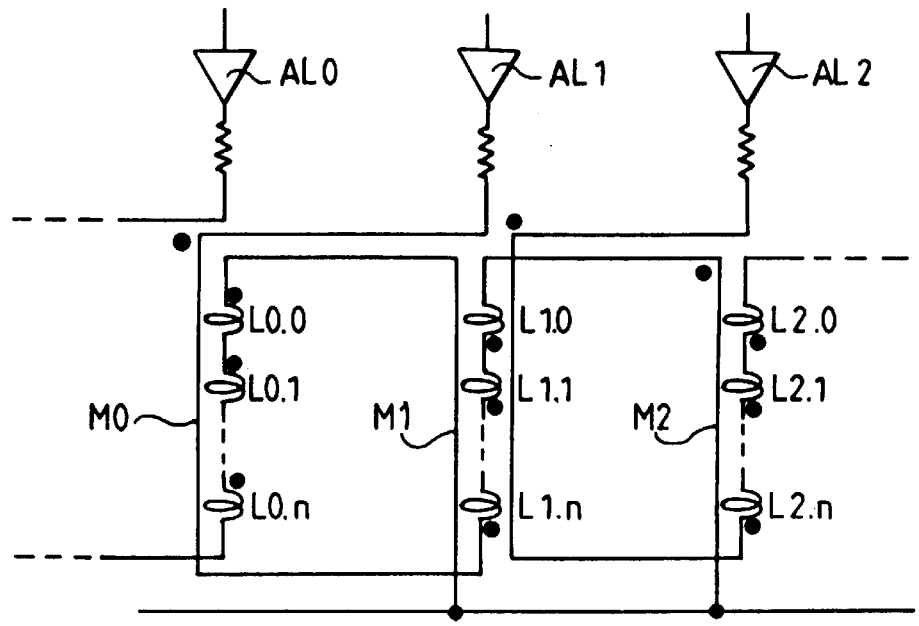
Figure 9:
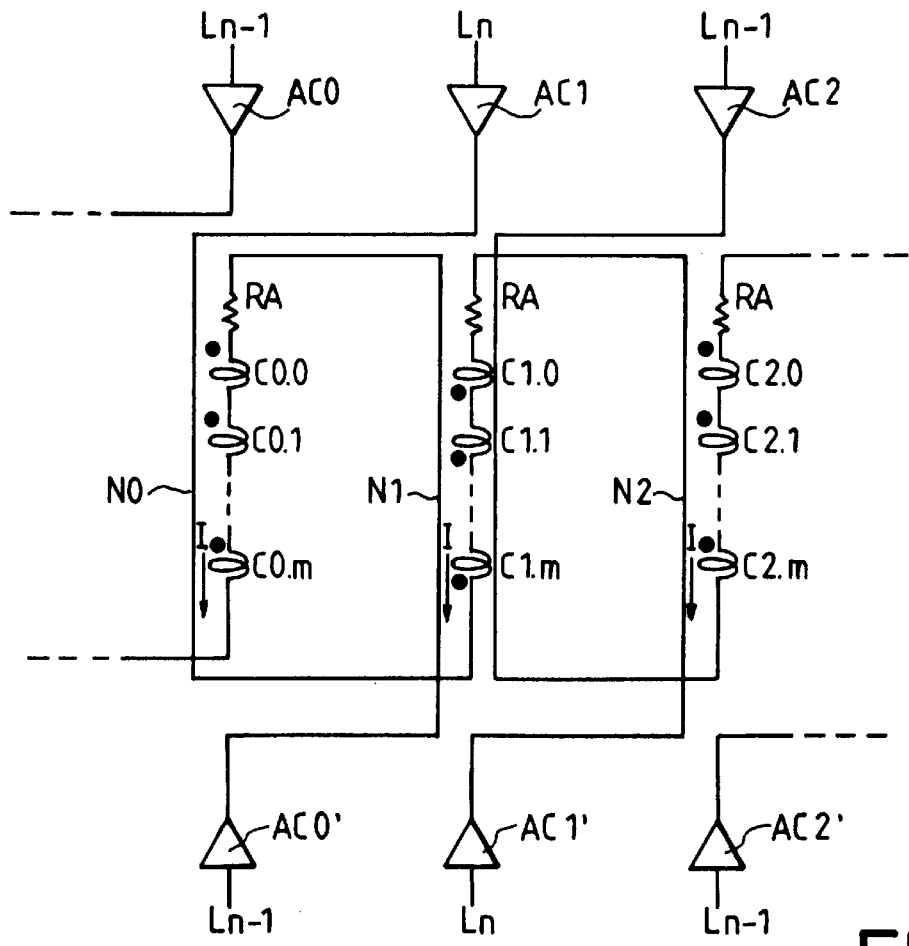

FIGS. 5a and 5b exemplify commands of magnetic heads placed in a matrix arrangement;

FIGS. 6 and 7 show an exemplary embodiment of the invention applicable to a matrix of magnetic heads;

FIGS. 8 and 9 show an alternative embodiment of the invention.

Figure 4:
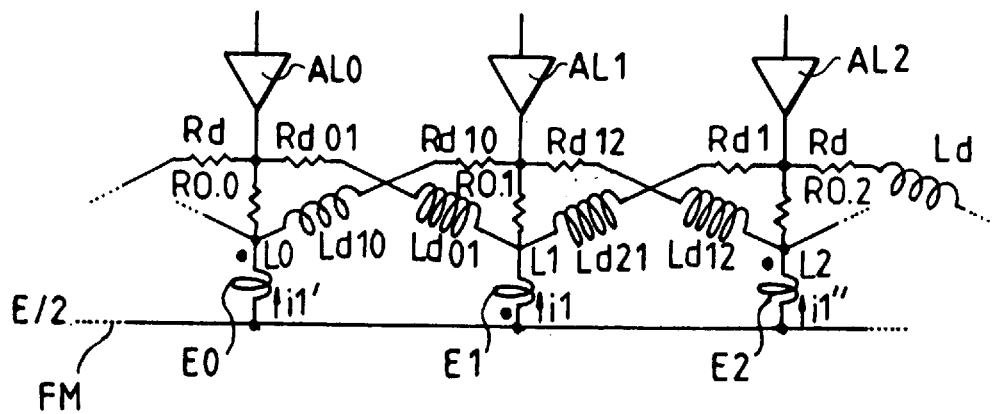
FIG. 4 shows an exemplary embodiment of the invention applicable to a row of magnetic heads.

Referring to FIG. 4, a description shall first of all be given of an exemplary embodiment of the invention applicable to a magnetic recording head of the type shown in the figure and therefore comprising a series of elementary heads.

Each elementary head has a control winding E0, E1, E2.

Each winding is connected between a control current supply circuit AL0, AL1, AL1 and a common conductor FM giving a common potential.

According to the invention, two neighboring windings such as EL0 and EL1 are wound in reverse winding directions in such a way that if they are supplied by currents in the same direction (for example currents going from the circuits AL0, AL1 towards the conductor FM), they create magnetic fields with opposite directions in the magnetic circuits of the elementary heads and hence in the recording medium.

The windings may also be considered to be wound in the same direction but that they are supplied in opposite directions. This is what is shown in FIG. 4 where the homologous inputs of the windings are referenced by dots placed at one end of the windings. It is seen for example that two windings E0 and E1 are supplied in opposite directions.

Each winding is supplied by its control circuit AL0, AL1, AL2 through a resistor R0.0, R0.1, R0.2 which determines the current in the winding.

Furthermore, the output of each control circuit of a winding is coupled to the windings located on either side of this winding. Thus, the circuit AL1 is coupled to the winding E0 by a resistor Rd10 and an inductor Ld10 and to the winding E2 by a resistor Rd12 and an inductor Ld12.

Figure 3:
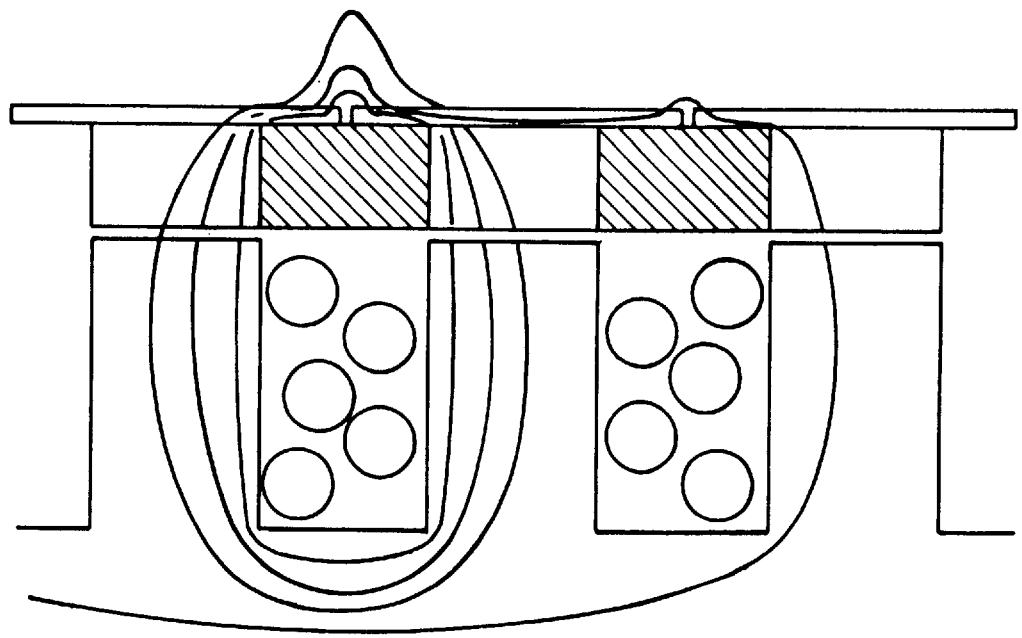
FIG. 3 show and example of the operation of magnetic heads close to one another.

When the winding E1 is being controlled, the circuit AL1 gives a current i1 to the winding E1. The winding E1 induces a magnetic field with a determined direction in the corresponding elementary magnetic head as well as a magnetic field with the same direction in the neighboring heads as explained already with reference to FIG. 3.

The windings of the neighboring heads E0 and E2 are coupled to the output of the control circuit AL1 respectively by a resistor Rd10 and an inductor Ld10 on the one hand and by a resistor Rd12 and an inductor Ld12. From the circuits AL1, the windings E0 and E2 receive currents i1' and i1" that create the induction of the magnetic fields which tend to counter the magnetic fields created in these heads by the winding E1: they do this because of the directions of the windings and their directions of supply.

The circuit of FIG. 4 therefore makes it possible to eliminate the influence that the controlling of a magnetic head has on the neighboring heads.

FIG. 5 shows a circuit that enables the correction, carried out in being linked with the circuit of FIG. 4, of this influence of a head on the neighboring heads in the context of magnetic heads organized in matrix form.

What must be done first of all is to describe a possible mode of control of a matrix-type magnetic head.

Figure 1:
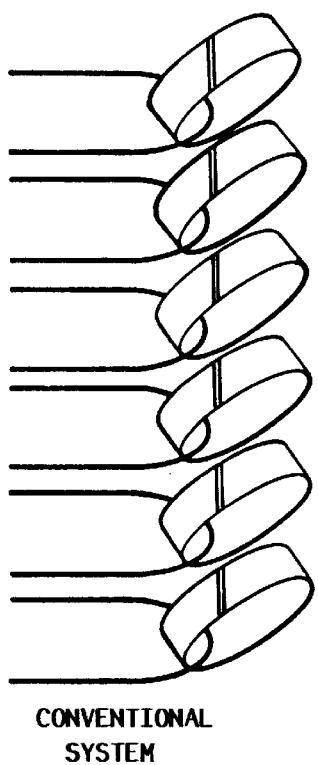
FIGS. 1 and 2 show exemplary embodiments of magnetic heads.
Figure 2:
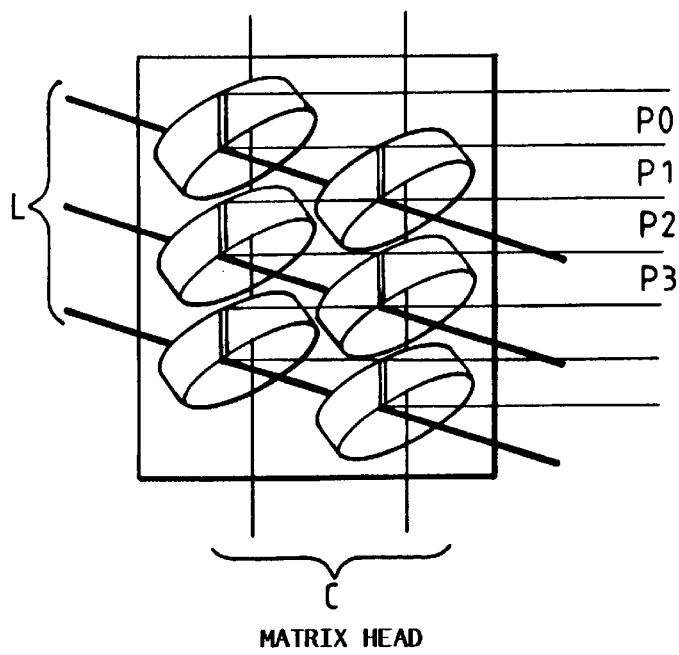

A head such as this, shown in FIG. 2, has a large number of magnetic poles distributed over L rows and C columns that are respectively called data rows and selection columns. It enables writing operations to be done on LxC tracks of a recording medium.

The addressing of the LxC magnetic heads is multiplexed.

According to the example of FIG. 5a, the matrix has five row wires, $14_1$, $14_3$ and $14_4$ and six column wires $15_1$ to $15_6$, giving thirty magnetic heads in all. In this example, the lines $14_1$, $14_3$ and $14_4$ and the column $15_4$ are addressed, i.e. these conductors are crossed by a current having an intensity I while the others are crossed by a current having an intensity–I/3. Thus, there points are recorded: those that are at the intersection of the column $15_4$ with the rows $14_1$, $14_3$ and $14_4$.

According to a variant shown in FIG. 5b, to each column there are successively applied two current pulses having opposite directions, first of all a positive pulse with an intensity $2I_1/3$. To the row conductors, there are applied constant values of intensity $I_1/3$ if a binary 1 digit is to be recorded or $-I_1/3$ if a binary 0 digit is to be recorded.

At the intersection of the conductors $14_1$, and $15_1$, when the pulse $2I_1/3$ appears, its effect is added to that of the current $I_1/3$ on the conductor $14_1$ to magnetize the magnetic medium with a field corresponding to the current $I_1$ having a value sufficient to write a 1. On the contrary, subsequently, during the negative pulse $-2I_1/3$, the magnetization corresponds to the current $i-I_1/3$ which generates a field that is not sufficient to erase the already-recorded information.

At the intersection of the conductor $15_1$ and the conductor $14_2$ of FIG. 5b, when the positive pulse appears, the magnetization corresponds to a current with an intensity $I_1/3$ that is insufficient to record or erase an information element. When the negative pulse $-2I_1/3$ arises, the magnetization is equal to that produced by current $-I_1$, which enables the recording of a 0.

It must be noted that, in this embodiment, unlike what has been described with reference to FIG. 5b, an information element is recorded on all the points of each line.

In general, in this embodiment, the sum of the currents of rows and columns, upon the appearance of the pulse having a same direction on the row as the current on the associated column, is sufficient to record an information element. During the pulse having an opposite direction, the sum of the currents is not enough to record or erase an information element. Favorable results are obtained when the absolute value of an alternation of the bipolar intensity is equal to twice the absolute value of the constant intensity in a line.

As described here above, the control of a head may influence the control of the neighboring heads all the more so as the magnetic structure that constitutes the support of the matrix-type head may be continuous from one head to the next one. The field lines associated with a pole may be closed by the neighboring poles creating cross-talk between data rows on the one hand and between selection columns on the other hand.

According to the invention, the direction of windings (or the directions of supply) alternate between even-numbered data rows and odd-numbered rows. This is also the case between even-numbered selection columns and odd-numbered columns.

The device used to correct cross-talk during the write operation consists in tapping a part of the current of the data rows and selection columns and injecting it respectively into the adjacent data rows and selection columns in order to create an effect that is proportional and opposite to the origin of the cross-talk on the magnetic poles concerned.

In both cases of controls shown in FIGS. 5a and 5b, each magnetic head is controlled by a column wire and a row wire. Each magnetic head therefore has a row winding (L0, L1, L2) connected to a row wire and to a column winding (C0, C1, C2) connected to a column wire. For a row of magnetic heads, the row windings of these heads are series-connected to the corresponding row wire. Similarly, for a column of magnetic heads, the column windings are series-connected to the corresponding column wire. To facilitate the description, reference is made to row windings and column windings but, as is known in the prior art, it is possible that these windings may not actually exist and that they may be simply formed by row wires and column wires.

To overcome the effects of cross-talk among neighboring row heads, the row wires are connected to one another as shown in FIG. 6 by means of coupling impedances. This cross-talk correction circuit is similar to that of FIG. 4. The row windings of one and the same row of magnetic heads are series-connected and wound in the same way as the windings L1.0 to L1.n. The windings of the neighboring lines, such as L0.0 to L0.n and L2.0 to L2.n are series connected and wound in the opposite direction to that of the windings L1.0 to L1.n.

Similarly, to overcome the effects of cross-talk among the neighboring column heads, the row wires may be connected to one another in the same way.

According to another embodiment of the invention, the row wires (or data row wires) are controlled as shown in FIG. 6.

By contrast, the column wires (or selection column wires) are controlled as shown in FIG. 7. Each column such as C0.0, . . . C0.n is supplied on either side by two amplifiers AC0 and AC0'. The outputs of the amplifiers are coupled to the neighboring amplifiers by impedances such as LC1.0, RC1.0 and LC1.0' and RC1.0'.

As can be seen in FIG. 6 for the data lines, if the windings are supplied by a voltage of E volts for the state +1 and 0 volts for the state −1, these windings are all connected to a common potential of E/2 volts. RO defines the nominal current at+or -ic/3. If i is the desired current and k*i the current to be injected into the neighboring windings to correct a cross-talk of k %, then $Rd=RO/k$ where Rd (such that RD0,1, RD1,0, RD12, RD21, . . . ) is the resistor that has to be connected between the data rows to correct the cross-talk. The inductor Ld (such as Ld1.0, Ld0.1, . . . Ld1.2) that is series connected enables the equalizing of the current build-up time. It should be such that:

$Ld=(L0-M)(1-k)/k$ where M is the mutual inductance between neighboring data rows.

To correct the cross-talk related to the selection columns, it must be assumed, that if the column n is active, the other columns are inactive and the amplifiers that supply them have their outputs in a state of high impedance and are therefore virtually disconnected. This permits a correction on the immediate neighbors and the most distant neighbors of the FIG. 7 type. RA defines the rated current of the selection columns at+or −2ic/3 and RC (such that RC1.0, RC1.2, RC1.0'. . . ) defines the correction resistors values to be connected such that:

$RC=(RA/2)(1-k)^2/k(1-k^n)$ where n represents the number of columns.

LC (such that LC1.0, LC1.2, LC1.0' . . . ) is an associated correction inductor that can be used to balance the reaction time between the main channel and the correction channels with (Ltotal column-M)/RA=LC/RC, M represents herein the mutual inductance between two neighboring selection columns.

FIGS. 8 and 9 show alternative embodiments of FIGS. 6 and 7 respectively. According to these variants, the coupling among neighboring magnetic heads is achieved by means of supplementary windings.

Thus, in FIG. 8, the windings L1.0, L1.1, . . . L1.n of the row of heads of the middle of the figure are series connected with a winding M0 that goes through the left-hand heads and a winding M2 that goes through the right-hand heads. To simplify the description, the windings M0 and M2 are represented by a single wire but there could be one or more turns at the position of each magnetic head. This depends on the value of the magnetic flux to be induced during the controlling of the line L1.0, L1.1, . . . L1.n to correct the cross-talk in the neighboring heads.

FIG. 9 shows a similar device for the control of the columns.

From the practical point of view, the making of the windings will be such that it will be the same wire that enables the making of the windings L1.0, L1.1, . . . L1.n and the making of the windings M0 and M2.

The directions of the windings M0 and M2 will be reversed with respect to the direction of the windings L1.0, L1.1, . . . L1.n so that a current flowing in the winding wire enables the induction, with the windings M0, M2, of fluxes that counter the cross-talk flux induced by the windings L1.0, L1.1, . . . L1.n.

What is claimed as new and desired to be secured by Letters Patent of the United States is:

1. A method for the magnetic recording of information on several parallel tracks in a digital system wherein the recording of an information element on a track is accomplished by the induction of a magnetic field having a predetermined direction in a zone of the track and wherein said magnetic field causes distortion in neighboring tracks characterized in that, during the recording of an information element on a first track there is provided a correction current during said recording on said first track, said correction current inducing a magnetic field having a direction, in zones of each of said neighboring tracks, that is the reverse of said predetermined direction, said correction current being derived directly from an excitation current of a head and said correction current being provided to neighboring heads wherein said correction current independently of any information elements recorded on any of said neighboring tracks caused by said recording on said first track.

2. Method according to claim 1, characterized in that each head has at least one control winding wire (L0, L1, L2), said wire being also wound in the neighboring heads, the entire assembly being supplied in series.

3. Method according to claim 2, characterized in that it comprises a matrix of magnetic heads controlled by data row wires (L0.0 to L2.n) and selection column wires (C0.0 to C2.m), a data row wire being series-connected with two cross-talk compensation wires (M0, M2) associated with the neighboring rows and a column wire being series-connected with two cross-talk compensation wires (C0, C2) associated with the neighboring columns.

4. A digital magnetic recording system comprising at least one series of magnetic recording heads enabling the recording of information elements on several tracks of a magnetic recording medium, each head inducing a magnetic recording flux on a track and magnetic cross-talk fluxes on the neighboring tracks, wherein a winding of each head is directly coupled at least to windings of neighboring recording heads by first and second circuits, a control current device is provided for transmitting a control current to said each head and to directly provide at least one current diverted towards each of the neighboring recording heads wherein each of said at least one current induces, in the neighboring recording heads, a magnetic flux which counters the cross-talk fluxes, and wherein said first circuits transmit diverted control currents to neighboring recording heads and said second circuits receive diverted control currents from neighboring heads.

5. A system according to claim 4, characterized in that the control current of a first head induces a magnetic flux, a part of which is diverted towards the magnetic heads, the coupling of the first head to the neighboring heads being done by at least one coupling resistor (Rd10, Rd12) having value whereby the current diverted by the coupling resistor induces a magnetic flux that counters the diverted magnetic flux.

6. A system according to claim 5, characterized in that the control windings of the magnetic heads are wound (L0, L1, L2) substantially in the same way, and have an input and an output of the control current, the input of the first head is connected to the outputs of the neighboring heads, in such a way that the control current of the first head flows in this head from the input towards the output while the diverted currents flow in the neighboring heads from the output towards the input.

7. A system according to claim 4, wherein the windings (L0, L1, L2) of the neighboring heads are wound in opposite directions and are supplied in the same direction.

8. System according to claim 7, characterized in that each column selection wire is connected by its two access points to two supply circuits which are at high impedance when the supply is cut off, each access point of each column wire being coupled to a corresponding access point of each neighboring column wire.

9. System according to claim 4 characterized in that it comprises a matrix of magnetic heads controlled by data row wires (L0.0 to L.2.n) and selection column wires (C0.0 to C2.m), the control of a magnetic head being done by the circulation of a determined current on a data row wire and a determined current on a selection column wire, each row wire being coupled to each neighboring row wire by a coupling impedance (Rd1.0, Rd1.2) and each column wire being coupled to each neighboring column wire by a coupling impedance (RC1.0, RC1.2').

10. System according to claim 9, characterized in that each row wire being common to the magnetic heads of a row of the matrix, the coupling of a row wire to each neighboring row wire is done by a common coupling impedance and each column wire being common to the magnetic heads of a column of the matrix, the coupling of a column wire to each neighboring column wire is done by a common coupling impedance.

11. System according to one of the claims 9 or 8, characterized in that the coupling of each access point of each column wire to the corresponding access point of each neighboring column wire is done by a common coupling impedance.

* * * * *